United States Patent
Li

(10) Patent No.: US 11,412,130 B2
(45) Date of Patent: Aug. 9, 2022

(54) METHOD, ELECTRONIC DEVICE AND STORAGE MEDIUM FOR SHOOTING VIDEO

(71) Applicant: Beijing Dajia Internet Information Technology Co., Ltd., Beijing (CN)

(72) Inventor: Qian Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/938,779

(22) Filed: Jul. 24, 2020

(65) Prior Publication Data
US 2021/0006710 A1  Jan. 7, 2021

(30) Foreign Application Priority Data
Jul. 25, 2019 (CN) .......................... 201910676944.3

(51) Int. Cl.
| H04N 5/222 | (2006.01) |
| H04N 5/232 | (2006.01) |
| H04N 5/262 | (2006.01) |
| H04N 1/00  | (2006.01) |

(52) U.S. Cl.
CPC ..... *H04N 5/23216* (2013.01); *H04N 1/00411* (2013.01); *H04N 5/232933* (2018.08); *H04N 5/2621* (2013.01)

(58) Field of Classification Search
CPC ......... H04N 5/23216; H04N 5/232933; H04N 5/2621; H04N 5/232939; H04N 5/265; H04N 5/76; H04N 1/00411
See application file for complete search history.

(56) References Cited

U.S. PATENT DOCUMENTS

| 2013/0114938 | A1  | 5/2013  | Kuriyama |
| 2017/0270967 | A1* | 9/2017  | Jang ........................ H04N 5/772 |
| 2019/0073811 | A1* | 3/2019  | Shah ................... G06K 9/00751 |
| 2019/0253619 | A1* | 8/2019  | Davydov ......... H04N 5/232935 |
| 2020/0412952 | A1* | 12/2020 | Hao .................... H04N 5/23216 |
| 2021/0006715 | A1* | 1/2021  | Hao ....................... G11B 27/031 |
| 2021/0043059 | A1* | 2/2021  | Chen ................. H04W 52/0206 |

FOREIGN PATENT DOCUMENTS

| CN | 106559686 A | 4/2017  |
| CN | 108012088 A | 5/2018  |
| CN | 108965705 A | 12/2018 |
| CN | 108965706 A | 12/2018 |
| CN | 109451245 A | 3/2019  |

OTHER PUBLICATIONS

Office Action received in priority application CN 201910676944.3 dated Jun. 12, 2020.

* cited by examiner

*Primary Examiner* — Kelly L Jerabek
(74) *Attorney, Agent, or Firm* — Knobbe, Martens, Olson & Bear, LLP

(57) ABSTRACT

A method, electronic device and computer readable storage medium for shooting a video are disclosed. The method can include: shooting a first video based on a first duration; receiving a first instruction, where the first instruction is used for shooting for extra time; shooting a second video based on the first instruction, in response to that the first duration ends; and generating a target video file based on the first video and the second video.

18 Claims, 7 Drawing Sheets

METHOD, ELECTRONIC DEVICE AND STORAGE MEDIUM FOR SHOOTING VIDEO

CROSS REFERENCE TO RELATED APPLICATION

This application is based on and claims priority under 35 U.S.C 119 to Chinese Patent Application No. 201910676944.3, filed on Jul. 25, 2019, in the China National Intellectual Property Administration. The entire disclosure of the above application is incorporated herein by reference.

FIELD

The present disclosure relates to the video processing field, and in particular, to a method, an electronic device and a storage medium of shooting video.

BACKGROUND

With the development of science and technology, the short video is popular in people's lives. People can record the wonderful moments in life into short videos and can watch the videos for the wonderful memories. The implementation of these functions depends on the selection of appropriate video shooting duration. A smart terminal can preset various shooting modes with different durations, such as, 10 seconds, 11 seconds, 15 seconds, 57 seconds, 1 minute, 3 minutes, 5 minutes, etc. Each mode corresponds to a fixed shooting duration. As can be seen, the shooting duration is fixed once preset in advance. As such, how to flexibly extend the video shooting in various modes, is a problem to be solved for those skilled in the art.

SUMMARY

Embodiments of the application provide a method, an electronic device and a storage medium for shooting a video.

In some embodiments, the method for shooting a video includes: shooting a first video based on a first duration; receiving a first instruction, where the first instruction is used for shooting for extra time; shooting a second video based on the first instruction, in response to that the first duration ends; and generating a target video file based on the first video and the second video.

In some embodiments, the electronic device for shooting a video includes: a memory, a processor, and a program that is stored on the memory and runs on the processor. The program, when executed by the processor, implements steps of: shooting a first video based on a first duration; receiving a first instruction, where the first instruction is used for shooting for extra time; shooting a second video based on the first instruction, in response to that the first duration ends; and generating a target video file based on the first video and the second video.

In some embodiments, the computer readable storage medium for shooting a video stores a program, where the program, when executed by a processor, implements steps of: shooting a first video based on a first duration; receiving a first instruction, where the first instruction is used for shooting for extra time; shooting a second video based on the first instruction, in response to that the first duration ends; and generating a target video file based on the first video and the second video.

DETAILED DESCRIPTION OF THE EMBODIMENTS

In order to solve one of the problems in the prior art that the video shooting duration cannot be flexibly configured, in the embodiments of the present disclosure, during the video shooting process, the shooting duration is extended based on the user's operation, and finally the final target video file is generated based on all the videos.

Embodiments of the present disclosure will be described in further detail below with reference to the drawings.

Figure 1:
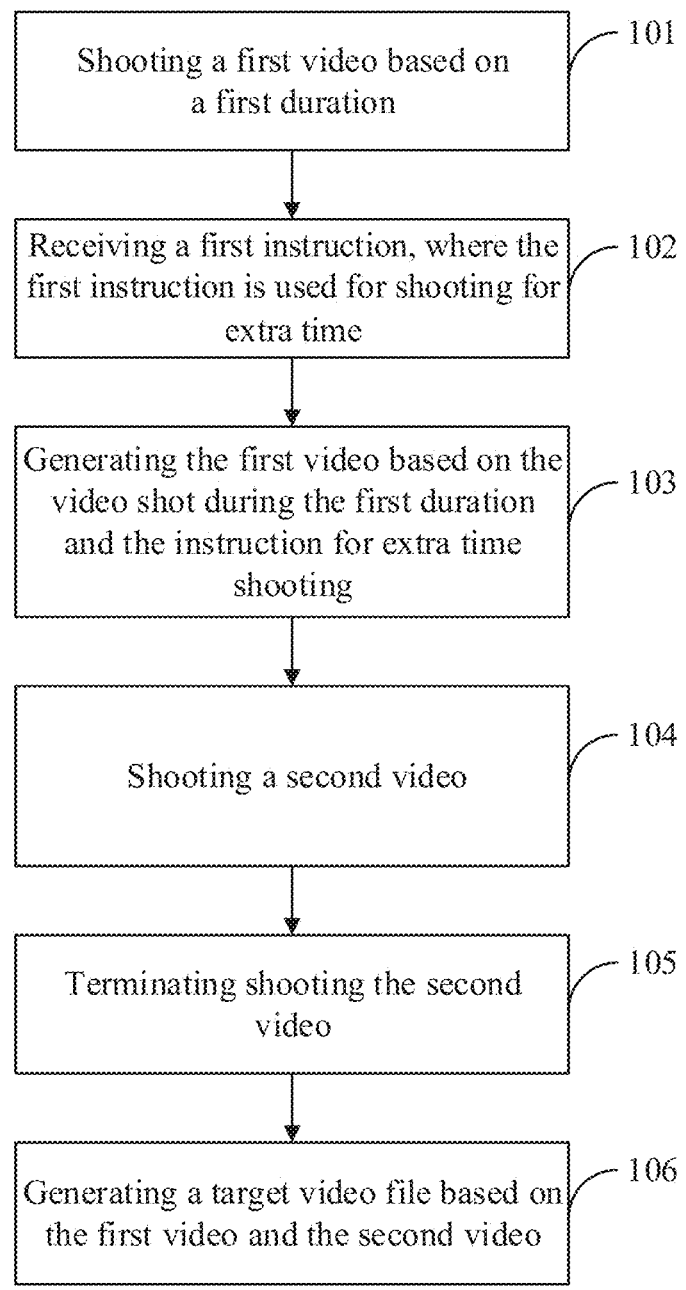
FIG. 1 is a flow schematic diagram of a method for shooting a video according to an embodiment of the present disclosure.

Referring to FIG. 1, a method for shooting a video is provided, which is applied to an electronic device. In some embodiments, the electronic device may be a portable computer, an intelligent mobile terminal, a smart terminal and the like. The method may include the following steps.

Step 101: shooting a first video based on a first duration.

In some embodiments, after a user starts the video shooting application in a smart terminal, an initial shooting duration is preset. In some embodiments, the initial shooting duration is the first duration.

Figure 2:
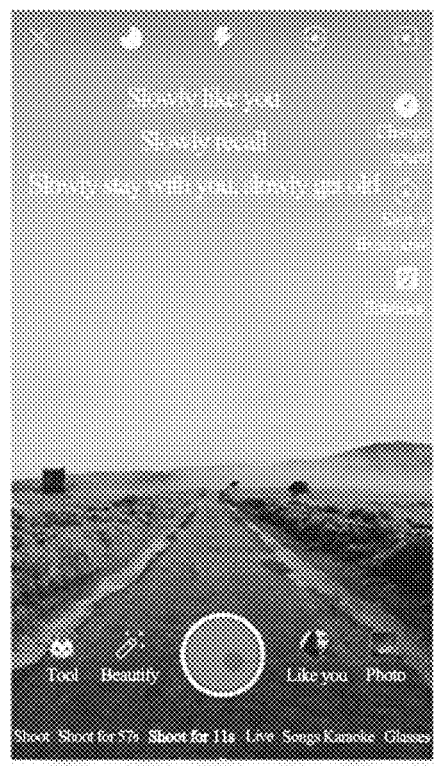
FIG. 2 is a schematic diagram illustrating the shooting in a clicking mode according to an embodiment of the present disclosure.
Figure 3:
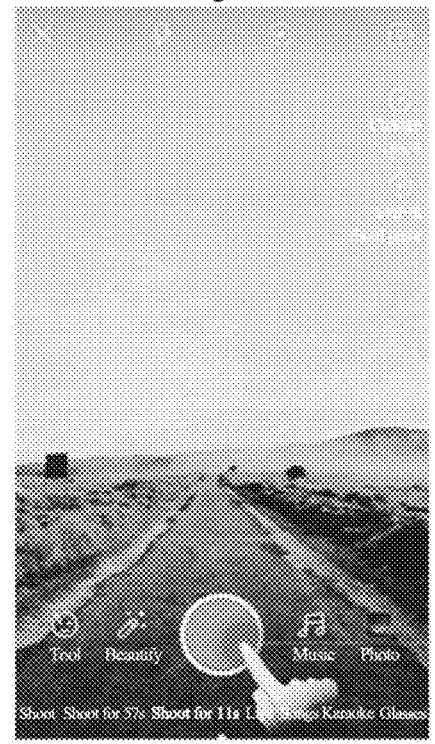
FIG. 3 is a schematic diagram illustrating the shooting in a long-pressing mode according to an embodiment of the present disclosure.

In some embodiments, referring to FIG. 2 and FIG. 3, the smart terminal sets the first duration to 11 seconds based on the user's instruction after the video shooting application is started. For example, the smart terminal can shoot a video of 11 seconds at most without extra time shooting.

In some embodiments, there are various shooting modes in a video shooting application. In a case without extra time shooting, the shooting modes are introduced as follows.

In some embodiments, the shooting mode is a clicking mode. Referring to FIG. 2, when a user clicks the "shoot" button on the operation interface of the smart terminal, the smart terminal starts to shoot a video. Before the shooting duration reaches the first duration, when the user clicks the "shoot" button again, the smart terminal pauses shooting. Further, when the user clicks the "stop" button, the smart terminal directly stops shooting, or when the shooting duration reaches the first duration, the smart terminal will automatically stop shooting.

In some embodiments, as shown in FIG. 2, the user initially presets the first duration as 11 seconds on the smart terminal. When the smart terminal determines that the "shoot" button is clicked, it starts shooting a video. Before the shooting duration reaches 11 seconds, if the smart terminal found that the "shoot" button is clicked again, it pauses shooting. In some embodiments, the smart terminal may directly stop shooting or continue shooting according to the user's operation. For example, when the shooting duration reaches 11 seconds, the smart terminal automatically stops shooting.

In some embodiments, the shooting mode is a long-pressing mode. Referring to FIG. 3, when a user long-presses the "shoot" button on the operation interface of the smart terminal, the smart terminal starts to shoot a video. Before the shooting duration reaches the first duration, when the user releases the "shoot" button, the smart terminal pauses shooting. In some embodiments, when the user clicks the "stop" button, the smart terminal directly stops shooting, or when the shooting duration reaches the first duration, the smart terminal automatically stops shooting.

In some embodiments, as shown in FIG. 3, for example, the user initially presets the first duration as 11 seconds on the smart terminal. When the smart terminal determines that the "shoot" button is long-pressed, it starts shooting a video. Before the shooting duration reaches 11 seconds, if the smart terminal found that the "shoot" button is released, it pauses shooting. In some embodiments, the smart terminal may directly stop shooting or continue shooting according to the user's operation. For example, when the shooting duration reaches 11 seconds, the smart terminal automatically stops shooting.

Step 102: receiving a first instruction, where the first instruction is used for shooting for extra time.

In some embodiments, during the shooting based on the first duration, an extra time button for extra time shooting is displayed on the operation interface. When the smart terminal detects that the instruction for shooting extra time is received, the smart terminal will continue to shoot for a second duration time based on the instruction after the first duration ends. Where the second duration is preset for extra time shooting. In some embodiments, the length of the second duration may be the same as that of the first duration, or is set according to the user's operation. For convenience of description, the case when the length of the second duration is the same as that of the first duration is illustrated in the following description.

Extra time shooting can be implemented in various shooting modes. In some embodiments, the two example shooting modes as mentioned above are used as follows.

In some embodiments, extra time shooting is implemented in the clicking mode. Referring to FIGS. 4A-4D, for example, the smart terminal displays an extra time button for extra time shooting on the operation interface during video shooting based on the first duration. When detecting that the extra time button is clicked, the smart terminal determines that the instruction for extra time shooting is received and at the same time reminds the user of entering the "extra time mode". In some embodiments, after the first duration ends, the smart terminal may start to shoot many segments of video, which can be referred as sub-second videos, based on the preset second duration.

Figure 4A:
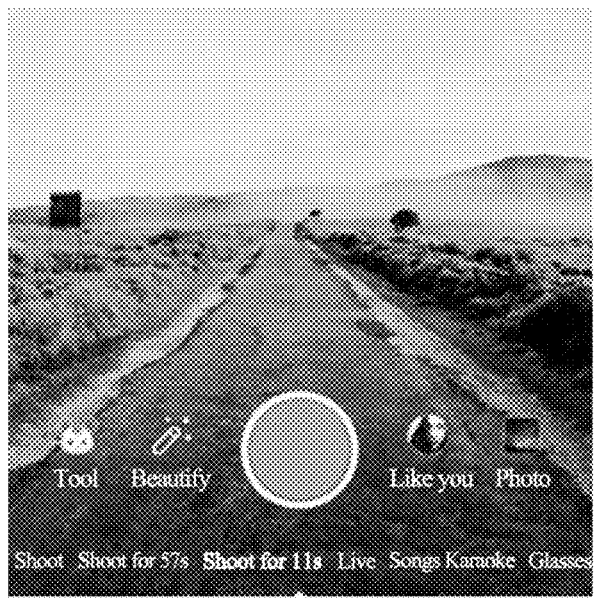
FIGS. 4A-4D are schematic diagrams illustrating the shooting in extra time in the clicking mode according to an embodiment of the present disclosure.
Figure 4B:
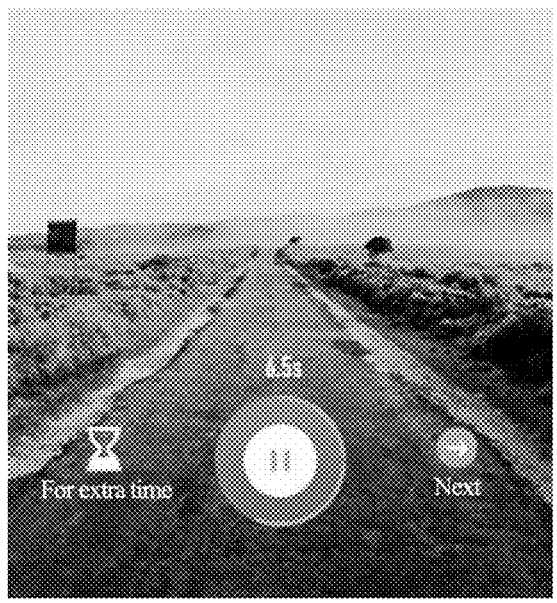
Figure 4C:
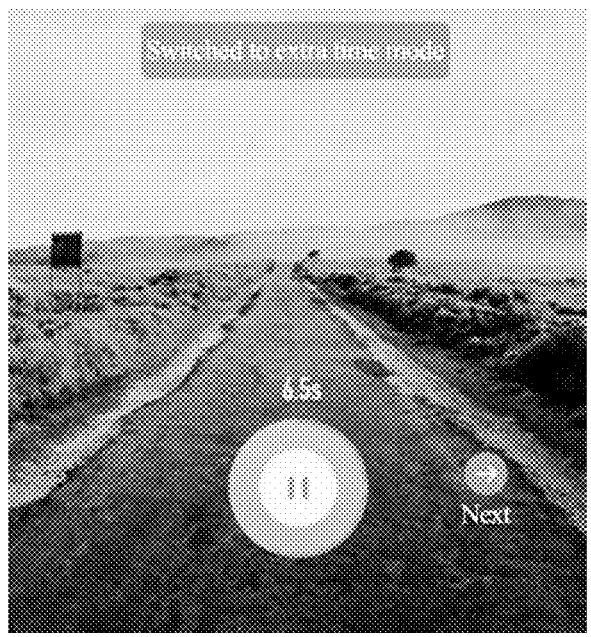
Figure 4D:

In some embodiments, referring to FIG. 4A, the first duration is set as 11 seconds by the user. When the user clicks the "shoot" button on the operation interface, the smart terminal starts shooting a video based on the first duration. In some embodiments, within the first duration, referring to FIG. 4B, the "for extra time" button is presented on the operation interface. When the smart terminal determines that the user clicks the "for extra time" button, the smart terminal confirms that it receives the instruction for extra time shooting. At the same time, the terminal displays the phrase "switched to extra time mode" on the operation interface to remind the user of entering the "extra time" mode without interrupting the shooting in the first duration, as shown in FIG. 4C. Then, in response to that the first duration ends, it directly enters the extra time mode to shoot based on the second duration. For example, as shown in FIG. 4D, the current shooting duration is 14 seconds which exceeds the first duration. The cases of pausing and stopping the shooting involved in the extra time shooting process are the same as those described above, and will not be repeated here.

In some embodiments, extra time shooting is implemented in the long-pressing mode. Referring to FIGS. 5A-5D, the smart terminal displays an extra time button during the video shooting within the first duration. When detecting that the shoot button on the video shooting operation interface is dragged to the position of the extra time button, the smart terminal determines that the instruction for extra time shooting is received and at the same time reminds the user of entering the "extra time mode". In some embodiments, in response to that the first duration ends, the smart terminal may record many segments of video (sub-second video) based on the second duration.

Figure 5A:
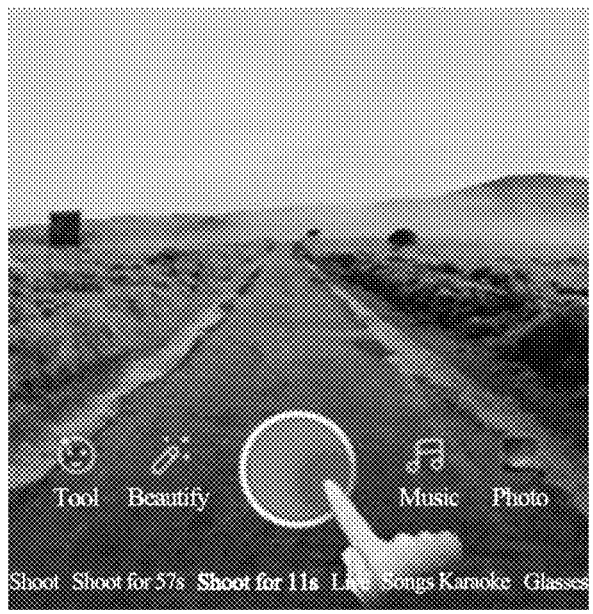
FIGS. 5A-5D are a schematic diagrams illustrating the shooting in extra time in the long-pressing mode according to an embodiment of the present disclosure.
Figure 5B:
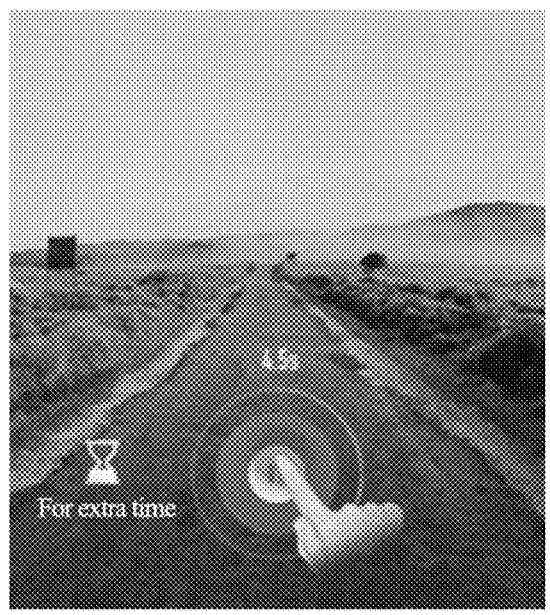
Figure 5C:
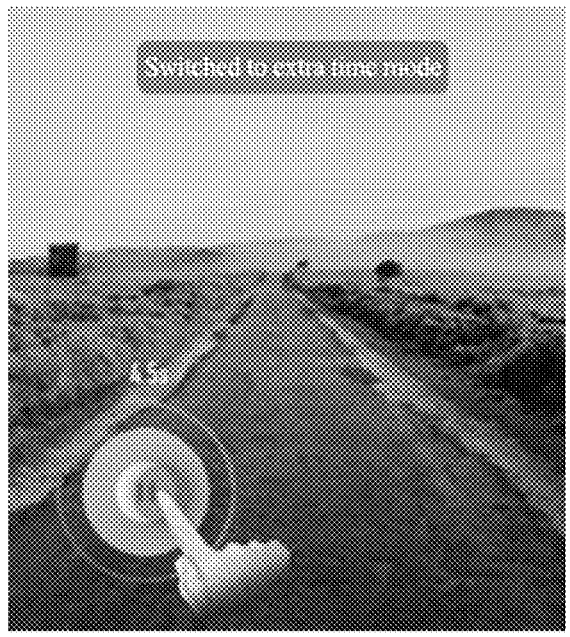
Figure 5D:
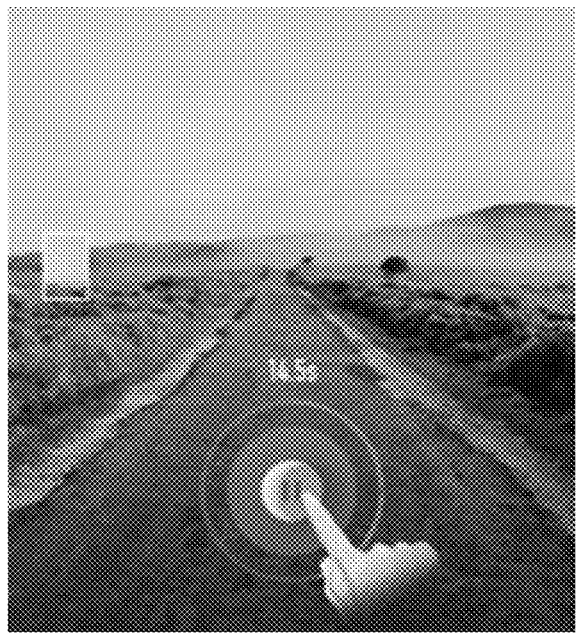

Referring to FIG. 5A, the first duration is set as 11 seconds by the user. When the user long-presses the "shoot" button, the smart terminal starts shooting a video based on the first duration. During the shooting, the "extra time" button is presented on the video shooting operation interface, as shown in FIG. 5B. When the smart terminal detects that the shoot button is dragged to the position of the extra time button, the smart terminal confirms that it receives the instruction for extra time shooting. At the same time the terminating displays the phrase "switched to extra time mode" on the operation interface to remind the user of entering the "extra time" mode, as shown in FIG. 5C. Then, in response to that the first duration ends, the terminal directly enters the extra time mode to shoot based on the second duration. For example, as shown in FIG. 5D, the current shooting duration of the smart terminal is 14 seconds which exceeds the first duration. Similarly, the cases of pausing and stropping the shooting involved in the extra time shooting process are the same as those described above, and will not be repeated here.

Step 103: generating the first video based on the video shot during the first duration and the instruction for extra time shooting.

In some embodiments, after receiving the instruction for the extra time shooting, the smart terminal generates the first video based on the video shot during the first duration. In some embodiments, the smart terminal generates a thumbnail corresponding to the first video, which is referred as the first thumbnail in the following description. For example, the first thumbnail is a small image obtained by compressing the first frame of image in the first video, or the thumbnail may be generated by detecting the wonderful frames in the video. In some embodiments, the size of the thumbnail is related to the length of the first duration, where the larger the length of the first duration, the greater the generated thumbnail.

Figure 6:
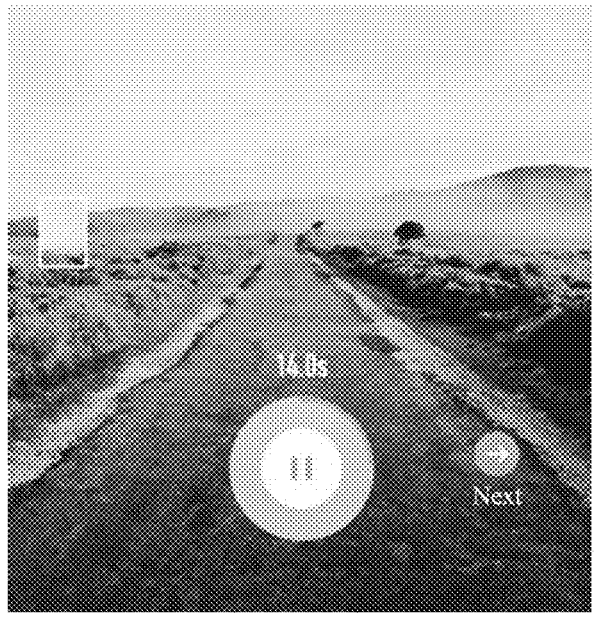
FIG. 6 is a schematic diagram of thumbnail display in the clicking mode according to an embodiment of the present disclosure.

In some embodiments, referring to FIGS. 4A-4D and FIG. 6, the generation of the first video is illustrated by taking the clicking mode as an example. The first duration preset by the smart terminal is 11 seconds. During the video shooting within the first duration, the smart terminal receives an instruction for extra time shooting. At the end of the first duration, the terminal automatically enters the extra time shooting and generates the first video. Then, the smart terminal will display the first thumbnail on the operation interface during the video for extra time, as shown in FIG. 6.

Step 104: shooting a second video.

In some embodiments, the second video includes a plurality of segments, i.e., the sub-second videos.

In some embodiments, the smart terminal generates a sub-second video whenever the shooting duration reaches the second duration, and retimes the shooting duration for shooting a successive sub-second video.

In some embodiments, the first duration is set to 11 seconds as an example. When the smart terminal completes the video shooting at the ends of the first duration and continues the extra time shooting, the smart terminal times the shooting duration. When the shooting duration reaches the second duration, such as, when the smart terminal shoots for 11 seconds, the smart terminal generates a sub-second video based on the content shot within the second duration. At the same time, the terminal retimes the shooting duration for shooting a successive sub-second video. When the retimed shooting duration reaches the second duration again, the above operation is repeated.

In some embodiments, the smart terminal generates a thumbnail, which can be referred to as a second thumbnail, corresponding to the sub-second video after obtaining the sub-second video. For example, the second thumbnail is a small image obtained by compressing the first frame of image in a sub-second video, or the thumbnail may be generated by detecting the wonderful frames in the video.

In some embodiments, each second thumbnail and the first thumbnail are joined together. For example, a newly generated thumbnail and the thumbnail that has been generated are joined together.

Figure 7:
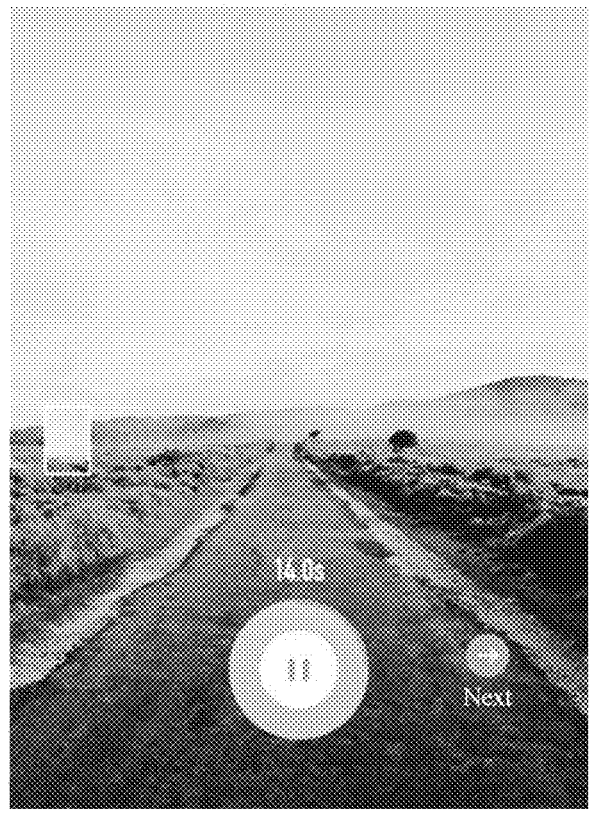
FIG. 7 is a schematic diagram of thumbnail display according to an embodiment of the present disclosure.

In some embodiments, as shown in FIG. 7, the first duration is set to 11 seconds as an example. The smart terminal generates the first video based on the video shot in the 11 seconds, and then displays the first thumbnail on the video shooting operation interface. Hereafter, the smart terminal continues the extra time shooting and the second duration is set to 11 seconds as an example. As shown in FIG. 7, a current total shooting duration is 14 seconds. As such, the shooting duration of the extra time shooting is 3 seconds which does not reach the second duration of 11 seconds. Thus, only the first thumbnail is displayed on the video shooting operation interface.

In some embodiments, based on the user's operation, when the smart terminal receives an instruction for pausing shooting, the smart terminal generates a sub-second video based on the video shot within the shooting duration, no matter that the shooting duration reaches the second duration or not.

Figure 8:
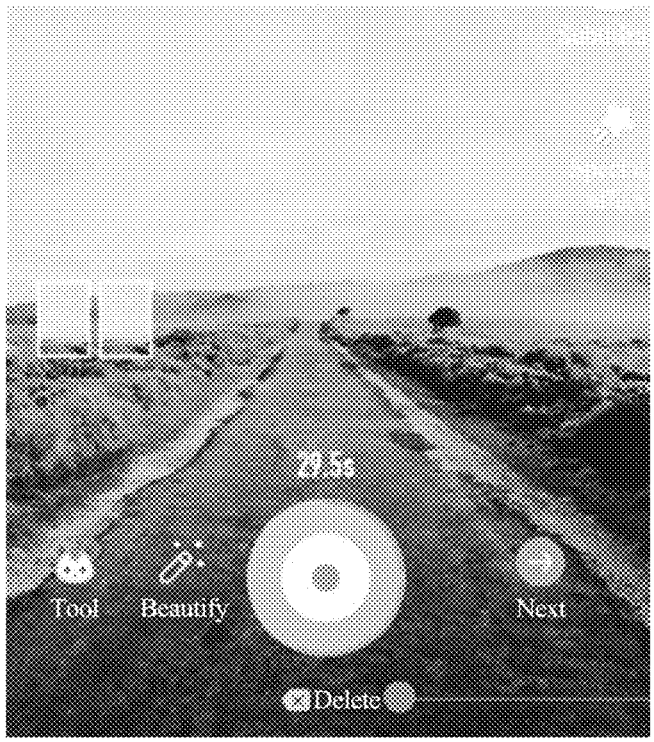
FIG. 8 is a schematic diagram of the operation interface display under the pause operation according to an embodiment of the present disclosure.

In some embodiments, referring to FIG. 8, the smart terminal receives the instruction for pausing shooting, and the current total shooting duration is 29.5 seconds. Taking the lengths of the first duration and the second duration are both 15 seconds as an example, so that the total shooting duration has not reached the first duration plus the second duration. If the shooting is paused at this time, a first video and a sub-second video will be generated, where the duration of the first video is 15 seconds and the duration of the sub-second video is 14.5 seconds. That is, although the shooting duration of the sub-second video does not reach the second duration of 15 seconds, the smart terminal still generates the sub-second video based on the video shot within the last 14.5 seconds.

In some embodiments, in response to that an instruction for deleting the video is received, the latest sub-second video is deleted and the cumulative total duration of the recorded video shooting is adjusted.

In some embodiments, a "delete" button appears on the operation interface when the smart terminal pauses shooting upon receiving an instruction for pausing shooting. When the user clicks the "delete" button, the smart terminal deletes the latest sub-second video in response to the instruction for deleting the video, and then adjusts the cumulative total duration of the video shooting. That is, the length value of the cumulative total shooting duration is restored as to the length value before shooting the deleted sub-second video. Here the shooting duration corresponding to the sub-second video may be the second duration, or may be less than the second duration.

Figure 9:
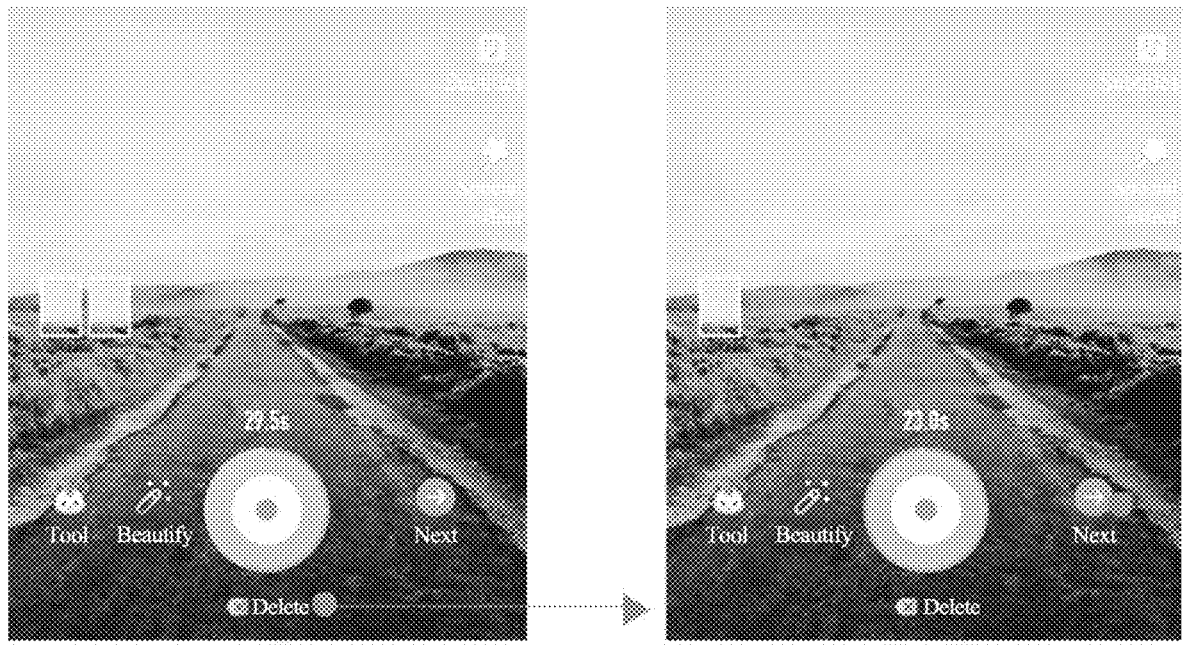
FIG. 9 are schematic diagrams of the operation interfaces during deletion operation according to an embodiment of the present disclosure.

Referring to FIG. 9, for example, the smart terminal pauses shooting at 29.5 seconds, when it receives the instruction for pausing shooting. Then, in response to that the "delete" button is clicked, the smart terminal deletes the latest sub-second video and deletes the second thumbnail corresponding to the sub-second video on the operation interface, while restoring the cumulative total shooting duration to the length value before shooting the deleted sub-second video, that is, restoring to 23 seconds.

Step 105: terminating shooting the second video.

In some embodiments, the extra time shooting is terminated in response to that the quantity of the sub-second videos reaches a preset quantity threshold value. Here, the extra time shooting is terminated also means that the video shooting is terminated.

For example, if the preset quantity threshold value is 5, the smart terminal generates at most 5 sub-second videos. In the extra time shooting process, the smart terminal generates the sub-second videos based on the second duration and the shot video. When the quantity of the generated sub-second videos reaches the preset quantity threshold value of 5, the smart terminal automatically terminates the shooting, and determines that the extra time shooting ends.

In some embodiments, the video shooting is terminated in response to that an instruction for terminating shooting is received. In some embodiments, a sub-second video is generated in response to the instruction for terminating shooting, no matter that the duration of the sub-second video reaches the second duration or not, thereby generating the second video based on all saved sub-second videos.

In some embodiments, the instruction for terminating shooting can be received in two example shooting modes as follows.

In some embodiments, the instruction for terminating shooting is generated in the clicking mode based on that: the smart terminal confirms that the user clicks the "stop" button during the extra time shooting; or the smart terminal determines that the pause time reaches a set duration, where the pausing instruction is generated in response to that the "shoot" button is clicked again during the extra time shooting.

In some embodiments, the instruction for terminating shooting is generated in the long-pressing mode based on that: the smart terminal confirms that the user clicks the "stop" button during the extra time shooting; or the smart terminal determines that the pause time reaches a set duration, where the pausing instruction is generated in response to that the "shoot" button is released during the extra time shooting.

Step 106: generating a target video file based on the first video and the second video.

The smart terminal may perform the editing, merging, and clipping operations on the first video and the second video to finally generate the corresponding target video file. In some embodiments, the editing operation includes but not limited to: adding a filter, adding voice-over and adding music; the merging operation is an operation of merging the first video with the second video into a target video file; and the clipping operation is to cut the video content in the first video and the second video based on a preset duration threshold value or according to the actual needs of the user.

The generation operation of the target video file will be discussed below based on different operation orders of editing and merging.

1. The first video and each sub-second video are edited respectively, and the edited first video is merged with each edited sub-second video. The target video file is generated based on the relationship between the total duration of the first temporary video and the second video, and the preset duration threshold value.

In some embodiments, if the smart terminal determines that the total duration of the first video and the second video exceeds the preset duration threshold value before performing the editing operation, the smart terminal will clip the first video and each sub-second video.

In some embodiments, before editing operation, the first video and each sub-second video are clipped respectively to let the total duration of the clipped first video and second video does not exceed the preset duration threshold value, and then the first video and each sub-second video are edited respectively and finally merged to generate the target video file that meets the preset duration threshold requirement.

For example, the duration threshold value is preset as 50 seconds, and the total duration of the first video and the second video is 60 seconds. In this example, at first the first video and each sub-second video are clipped, and the total duration of the clipped first video and second video is 45 seconds, which meets the preset duration threshold requirement. Then the first video and each second video are edited, for example, adding a filter, adding voice-over and adding music, and finally merged to generate the target video file.

In some embodiments, after the first video and each sub-second video are edited and merged to generate a target video file, the target video file is cut based on the duration threshold value to generate a plurality of small target video files that meet the preset duration threshold requirement. For example, the duration threshold value preset is set as 50 seconds, and the total duration of the first video and the second video is 60 seconds. At first the first video and the each sub-second temporary video are edited, for example, adding a filter, adding voice-over and adding music, and then merged to generate a target video file of 60 seconds. The target video file of 60 seconds is cut based on the duration threshold value to include a 50-second small target video file and a 10-second small target video file.

In some embodiments, if it is determined that the total duration of the first video and the second video does not exceed the preset duration threshold value, the first video and the second video are clipped selectively as follows.

In some embodiments, the first video and the sub-second videos can be selectively clipped according to the actual needs of the user, and are edited respectively, and then merged to generate a target video file, where the duration of the target video file is less than the preset duration threshold value. For example, the duration threshold value is preset as 50 seconds, and the total duration of the first video and the second video is 40 seconds. The first video and the sub-second videos can be selectively clipped according to the actual needs of the user. For example, the video content of 10 seconds is deleted, and the clipped first video and sub-second videos are edited respectively and then merged to generate a target video file of 30 seconds.

In some embodiments, the first video and the second video are merged first. Then the merged video file is edited later. The target video file is generated based on the relationship between the total duration of the first video and the second video and the preset duration threshold value as follows.

In some embodiments, if the smart terminal determines that the total duration of the first video and the second video exceeds the preset duration threshold value before performing the editing operation, the smart terminal will clip the first video and the sub-second videos as follows.

In some embodiments, the first video and the second video are merged, then the merged video file is clipped according to the preset duration threshold value, and the target video file that meets the preset duration threshold requirement is generated by editing the merged video file. For example, the duration threshold value is preset as 50 seconds, and the total duration of the first temporary video and the second video is 60 seconds. In this example, at first the first video and the second video are merged, and then the merged video file is clipped, for example, the total duration of the merged and clipped video file is 45 seconds, which meets the preset duration threshold requirement. Then the merged video file is edited, for example, adding a filter, adding voice-over and adding music. The target video file is generated based on the edited merged video file.

In some embodiments, after the first video and the second video are merged and edited to generate a target video file, the target video file is cut based on the duration threshold value to generate a plurality of small target video files that meet the preset duration threshold requirement.

For example, the duration threshold value is preset as 50 seconds, and the total duration of the first temporary video and the second video is 60 seconds. At first the first video and the second video are merged, and then the merged video file is edited, for example, adding a filter, adding voice-over and adding music. The target video file of 60 seconds is generated based on the edited merged video. Then the target video file is cut based on the duration threshold value to include a 50-second small target video file and a 10-second small target video file.

In some embodiments, if it is determined that the total duration of the first video and the second video does not exceed the preset duration threshold value, the first video and the sub-second video are clipped as follows.

In some embodiments, the first video and the second video are merged, the merged video file can be selectively clipped according to the actual needs of the user, and then the merged video file is edited to generate a target video file, where the duration of the target video file must be below the preset duration threshold value. For example, the duration threshold value is preset as 50 seconds, and the total duration of the first video and the second video is 40 seconds. At first the first video and the second video are merged, and clipped selectively according to the actual needs of the user, for example, the video content of 10 seconds is deleted. The merged video file is edited, for example, adding a filter, adding voice-over and adding music, to finally generate a target video file of 30 seconds.

Figure 10:
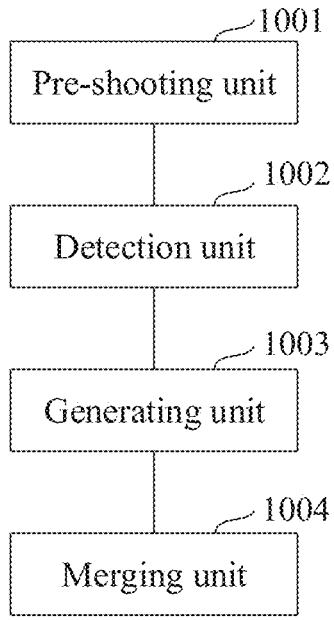
FIG. 10 is a schematic structural diagram of a smart terminal according to an embodiment of the present disclosure.

Based on the above embodiments, referring to FIG. 10, an electronic device in an embodiment of the present disclosure includes at least:

a pre-shooting unit 1001 configured to shoot a first video based on a first duration;

a detection unit 1002 configured to detect whether a first instruction is received, where the first instruction is used for shooting for extra time;

a generating unit 1003 configured to generate the first video and a second video, where the second video is shot based on the first instruction in response to that the first duration ends;

a merging unit 1004 configured to generate a target video file based on the first video and the second video.

In some embodiments, the first instruction is received based on that an extra time button is clicked; or that a shooting button is dragged to a position of the extra time button.

In some embodiments, the second video comprises a plurality of successive sub-second videos.

In some embodiments, the generating unit 1003 is configured to generate a sub-second video in response to that a shooting duration reaches a second duration; and retime the shooting duration for shooting a successive sub-second video.

In some embodiments, the generating unit 1003 is configured to generate a first thumbnail corresponding to the first video; generate each second thumbnail corresponding to respective one of sub-second videos; and join the first thumbnail and each second thumbnail.

In some embodiments, the generating unit 1003 is configured to generate a sub-second video, in response to that a second instruction is received, where the second instruction is used for pausing shooting; generate the second video in response to that a third instruction is received, where third instruction is used for terminating shooting; or delete a latest sub-second video and adjusting a total shooting duration, in response to that a fourth instruction is received, where the fourth instruction is used for deleting a video.

In some embodiments, the generating unit 1003 is configured to terminate shooting the second video, in response to that a quantity of the second videos reaches a preset quantity threshold value; or that an instruction for terminating shooting is received.

In some embodiments, the merging unit 1004 is configured to determine an edited first video by editing the first video; determine an edited second video by editing each sub-second video, and generate the target video file by merging the edited first video with the edited second video.

In some embodiments, the merging unit 1004 is configured to determine a merged video file by merging the first video with the second video, and generate the target video file by editing the merged video file.

In some embodiments, the merging unit 1004 is configured to, in response to determining that a total duration of the first video and the second video exceeds a preset duration threshold value, clip the first video and the second video respectively based on the preset duration threshold value; clip the merged video file based on the preset duration threshold value; or cut the target video file based on the preset duration threshold value.

Figure 11:
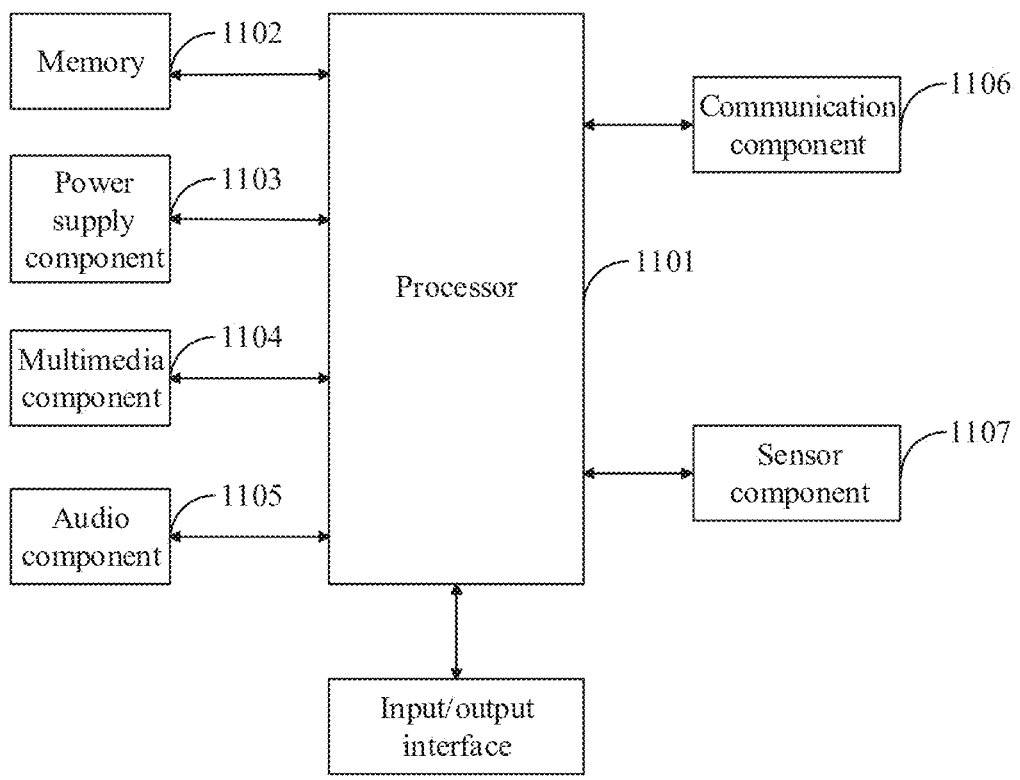
FIG. 11 is a schematic structural diagram of a smart terminal according to another embodiment of the present disclosure.

Based on the same application concept, referring to FIG. 11, an embodiment of the present disclosure provides an electronic device, which includes at least a memory 1101 and a processor 1102, where:

the memory 1101 stores the executable program;

the program, when executed by the processor 1102, implements steps of the method of any of the embodiments above.

In some embodiments, the electronic device further includes:

a power supply component 1103 is configured to provide the electrical energy;

a multimedia component 1104 is configured to implement the multimedia function;

an audio component 1105 is configured to implement the audio input and output functions;

a communication component 1106 is configured to implement the communication function;

a sensor component 1107 is configured to implement the state perception.

Based on the same application concept, an embodiment of the present disclosure provides a storage medium. When the programs in the storage medium are executed by a processor, the processor can perform the method of any of the embodiments above.

In summary, in the embodiments of the present disclosure, firstly a video is shot based on the first duration, and an instruction for extra time shooting is received during this process. At the end of the first duration, the video shooting is continued, and a first video is generated based on the video shot during the first duration. The second video is generated based on the video shot in the extra time. A target video file is generated based on the first video and the second video. It can be seen that the present disclosure can appropriately extend the shooting duration according to the actual shooting needs, effectively solving the problem that the shooting duration of the video cannot be flexibly configured. As such, there is no need for the user to determine the shooting duration in advance, reducing the shooting cost, enhancing the usage experience of the user, and effectively avoiding the regret of the missed beautiful shooting moments due to the inability to change the shooting duration.

It should be understood by those skilled in the art that the embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the disclosure have been described, those skilled in the art can make additional alterations and modifications to these embodiments once they learn about the basic creative concepts. Thus the attached claims are intended to be interpreted to include the preferred embodiments as well as all the alterations and modifications falling within the scope of the disclosure.

Evidently those skilled in the art can make various modifications and variations to the embodiments of the disclosure without departing from the spirit and scope of the embodiments of the disclosure. Thus the disclosure is also intended to encompass these modifications and variations therein as long as these modifications and variations to the embodiments of the disclosure come into the scope of the claims of the disclosure and their equivalents.

What is claimed is:

1. A method of shooting a video, comprising:
   shooting a first video based on a first duration in response to a shooting button at a first position on an operation interface being long-pressed;
   causing presentation of an extra time button for extra time shooting at a second position on the operation interface, wherein the second position is different from the first position;
   receiving a first instruction in response to the shooting button at the first position being dragged to the second position during the first duration, wherein the first instruction is used for shooting for extra time;
   shooting a second video based on the first instruction, in response to the first duration ending; and
   generating a target video file based on the first video and the second video.

2. The method of claim 1, wherein the second video comprises a plurality of successive sub-second videos.

3. The method of claim 2, said that shooting a second video comprises:
   generating a sub-second video in response to a shooting duration reaching a second duration; and
   retiming the shooting duration for shooting a successive sub-second video.

4. The method of claim 2, further comprising:
   generating a first thumbnail corresponding to the first video;
   generating each second thumbnail corresponding to respective one of sub-second videos;
   joining the first thumbnail and each second thumbnail.

5. The method of claim 2, further comprising:
   generating a sub-second video, in response to a second instruction being received, wherein the second instruction is used for pausing shooting;
   generating the second video in response to a third instruction being received, wherein third instruction is used for terminating shooting; or
   deleting a latest sub-second video and adjusting a total shooting duration, in response to a fourth instruction being received, wherein the fourth instruction is used for deleting a video.

6. The method of claim 2, further comprising:
   terminating shooting the second video, in response to:
   a quantity of the second videos reaching a preset quantity threshold value; or
   an instruction for terminating shooting being received.

7. The method of claim 2,
   said generating the target video file comprising:
   determining an edited first video by editing the first video;
   determining an edited second video by editing each sub-second video, and
   generating the target video file by merging the edited first video with the edited second video;
   or
   determining a merged video file by merging the first video with the second video, and
   generating the target video file by editing the merged video file.

8. The method of claim 7, further comprising:
   in response to determining that a total duration of the first video and the second video exceeds a preset duration threshold value, performing any one of following operations:
   clipping the first video and the second video respectively based on the preset duration threshold value;
   clipping the merged video file based on the preset duration threshold value; and
   cutting the target video file based on the preset duration threshold value.

9. An electronic device for shooting a video, comprising:
   a memory;
   a processor; and
   a program that is stored on the memory and runs on the processor;
   wherein the program, when executed by the processor, implements steps of:
   shooting a first video based on a first duration in response to a shooting button at a first position on an operation interface being long-pressed;
   causing presentation of an extra time button for extra time shooting at a second position on the operation interface, wherein the second position is different from the first position;
   receiving a first instruction in response to the shooting button at the first position being dragged to the second position during the first duration, wherein the first instruction is used for shooting for extra time;
   shooting a second video based on the first instruction, in response to the first duration ending; and
   generating a target video file based on the first video and the second video.

10. The electronic device of claim 9, wherein the second video comprises a plurality of successive sub-second videos.

11. The electronic device of claim 10, said shooting a second video comprising:
generating a sub-second video in response to a shooting duration reaching a second duration; and
retiming the shooting duration for shooting a successive sub-second video.

12. The electronic device of claim 10, wherein the program, when executed by the processor, further implements steps of:
generating a first thumbnail corresponding to the first video;
generating each second thumbnail corresponding to respective one of sub-second videos;
joining the first thumbnail and each second thumbnail.

13. The electronic device of claim 10, wherein the program, when executed by the processor, further implements steps of:
generating a sub-second video, in response to a second instruction being received, wherein the second instruction is used for pausing shooting;
generating the second video in response to a third instruction being received, wherein third instruction is used for terminating shooting; or
deleting a latest sub-second video and adjusting a total shooting duration, in response to a fourth instruction being received, wherein the fourth instruction is used for deleting a video.

14. The electronic device of claim 10, wherein the program, when executed by the processor, further implements steps of:
terminating shooting the second video, in response to:
a quantity of the second videos reaching a preset quantity threshold value; or
an instruction for terminating shooting being received.

15. The electronic device of claim 10,
said generating the target video file comprising:
determining an edited first video by editing the first video;
determining an edited second video by editing each sub-second video, and
generating the target video file by merging the edited first video with the edited second video; or
determining a merged video file by merging the first video with the second video, and
generating the target video file by editing the merged video file.

16. The electronic device of claim 15, wherein the program, when executed by the processor, further implements steps of:
in response to determining that a total duration of the first video and the second video exceeds a preset duration threshold value, performing any one of following operations:
clipping the first video and the second video respectively based on the preset duration threshold value;
clipping the merged video file based on the preset duration threshold value; and
cutting the target video file based on the preset duration threshold value.

17. A non-transitory computer readable storage medium for shooting a video, wherein, the computer readable storage medium stores a program, wherein the program, when executed by a processor, implements steps of:
shooting a first video based on a first duration in response to a shooting button at a first position on an operation interface being long-pressed;
causing presentation of an extra time button for extra time shooting at a second position on the operation interface, wherein the second position is different from the first position;
receiving a first instruction in response to the shooting button at the first position being dragged to the second position during the first duration, wherein the first instruction is used for shooting for extra time;
shooting a second video based on the first instruction, in response to that the first duration ends; and
generating a target video file based on the first video and the second video.

18. The non-transitory computer readable storage medium of claim 17, wherein the second video comprises a plurality of successive sub-second videos.

* * * * *